United States Patent
Tanizaki et al.

(10) Patent No.: US 10,332,263 B2
(45) Date of Patent: Jun. 25, 2019

(54) IMAGE PROCESSING DEVICE, IMAGE PROCESSING METHOD, AND NON-TRANSITORY COMPUTER-READABLE RECORDING MEDIUM

(71) Applicant: PFU LIMITED, Kahoku-shi, Ishikawa (JP)

(72) Inventors: Hiroki Tanizaki, Ishikawa (JP); Kiyoto Kosaka, Ishikawa (JP)

(73) Assignee: PFU LIMITED, Ishikawa (JP)

( * ) Notice: Subject to any disclaimer, the term of this patent is extended or adjusted under 35 U.S.C. 154(b) by 149 days.

(21) Appl. No.: 15/442,060

(22) Filed: Feb. 24, 2017

(65) Prior Publication Data
US 2018/0122084 A1    May 3, 2018

(30) Foreign Application Priority Data
Oct. 28, 2016  (JP) .................. 2016-211597

(51) Int. Cl.
*G06T 7/12*   (2017.01)
*G06T 7/194*  (2017.01)
*G06T 7/11*   (2017.01)
*G06T 5/40*   (2006.01)
*G06T 5/00*   (2006.01)

(52) U.S. Cl.
CPC .............. *G06T 7/194* (2017.01); *G06T 5/008* (2013.01); *G06T 5/40* (2013.01); *G06T 7/11* (2017.01); *G06T 2207/10024* (2013.01); *G06T 2207/20012* (2013.01); *G06T 2207/30176* (2013.01)

(58) Field of Classification Search
CPC ........... G06T 5/008; G06T 5/40; G06T 7/194; G06T 7/11
See application file for complete search history.

(56) References Cited

U.S. PATENT DOCUMENTS

| 6,667,774 B2 * | 12/2003 | Berman ................ H04N 5/272 348/584 |
| 8,452,689 B1 * | 5/2013 | Medina, III ......... G06Q 20/042 705/37 |
| 9,245,349 B2 * | 1/2016 | Heo .......................... G06T 7/13 |

(Continued)

FOREIGN PATENT DOCUMENTS

| JP | 2004-110369 A | 4/2004 |
| JP | 2006-148292 A | 6/2006 |

(Continued)

OTHER PUBLICATIONS

Japanese Office Action dated Jan. 16, 2018 issued in Japanese Patent Application No. 2016-211597 (with English translation).

*Primary Examiner* — Gregory M Desire
(74) *Attorney, Agent, or Firm* — McDermott Will & Emery LLP

(57) ABSTRACT

An image processing device includes a division unit which divides an input image into a first content area and a first background area, a generation unit which corrects a first content area pixel included in the first content area by using a first peripheral pixel existing in the vicinity of the first content area among first background area pixels included in the first background area to generate a first background image formed with the after-correction first content area pixel and the first background area pixel, and a removal unit which removes the first background image from the input image.

18 Claims, 15 Drawing Sheets

(56) References Cited

U.S. PATENT DOCUMENTS

| | | | |
|---|---|---|---|
| 9,661,166 | B2 | 5/2017 | Hayashi et al. |
| 9,712,717 | B2 | 7/2017 | Hayashi et al. |
| 2016/0189389 | A1 | 6/2016 | Sawada |
| 2016/0277613 | A1 | 9/2016 | Hayashi et al. |
| 2016/0286080 | A1 | 9/2016 | Hayashi et al. |
| 2018/0122084 | A1* | 5/2018 | Tanizaki ................ G06T 5/008 |

FOREIGN PATENT DOCUMENTS

| | | |
|---|---|---|
| JP | 2010-191952 A | 9/2010 |
| JP | 2016-127350 A | 7/2016 |
| JP | 2016-178552 A | 10/2016 |
| JP | 2016-178553 A | 10/2016 |

* cited by examiner

IMAGE PROCESSING DEVICE, IMAGE PROCESSING METHOD, AND NON-TRANSITORY COMPUTER-READABLE RECORDING MEDIUM

CROSS-REFERENCE TO RELATED APPLICATION

This application is based upon and claims the benefit of priority of the prior Japanese Patent Application No. 2016-211597, filed on Oct. 28, 2016, the entire contents of which are incorporated herein by reference.

FIELD

The embodiments discussed herein are related to an image processing device, an image processing method, and a non-transitory computer-readable recording medium.

BACKGROUND

In recent years, there are many chances to capture documents as a camera. In addition, in many case, optical character recognition (OCR) is performed on the captured document image.

Examples of related-art are described in Japanese Laid-open Patent Publication No. 2016-127350 and Japanese Laid-open Patent Publication No. 2010-191952.

If the document is captured by a camera, in some cases, color spots or shadow occur in the background in the captured document image, and thus, a degree of recognition for content such as pictures or characters in the document image is deteriorated.

SUMMARY

According to an aspect of an embodiment, an image processing device includes a division unit which divides an input image into a first content area and a first background area, a generation unit which corrects a first content area pixel included in the first content area by using a first peripheral pixel existing in the vicinity of the first content area among first background area pixels included in the first background area to generate a first background image formed with the after-correction first content area pixel and the first background area pixel, and a removal unit which removes the first background image from the input image.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
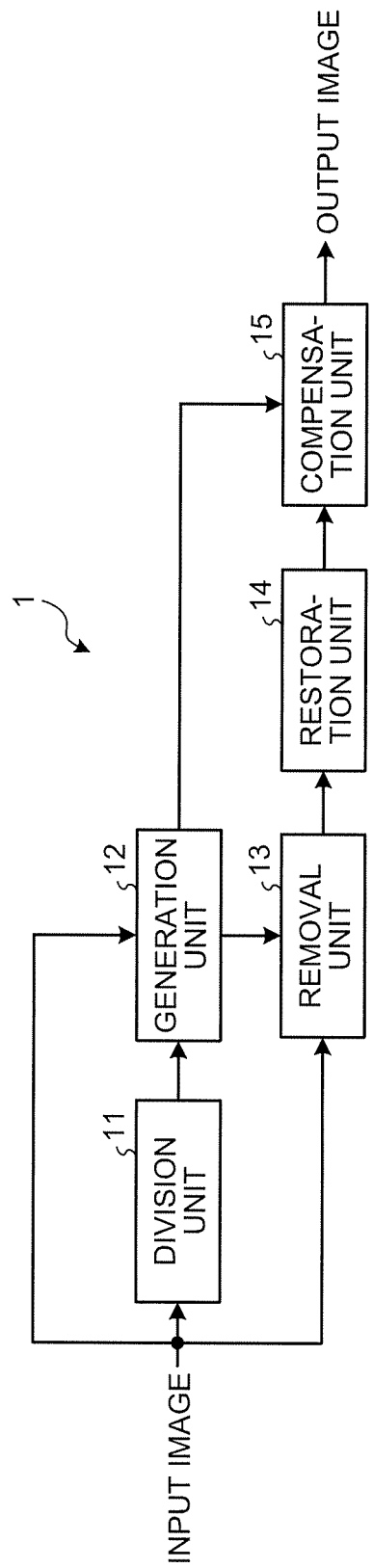
FIG. 1 is a diagram illustrating a configuration example of an image processing device according to a first embodiment.

Preferred embodiments of the present invention will be explained with reference to accompanying drawings. In addition, the image processing device, the image processing method, and the non-transitory computer-readable recording medium to the present disclosure are not limited to the embodiments. In addition, in the embodiments, configurations having the same functions and steps performing the same process are denoted by the same reference numerals.

[a] First Embodiment

Configuration of Image Processing Device

FIG. 1 is a diagram illustrating a configuration example of an image processing device according to a first embodiment. In FIG. 1, an image processing device 1 is configured to include a division unit 11, a generation unit 12, a removal unit 13, a restoration unit 14, and a compensation unit 15.

The division unit 11, the generation unit 12, the removal unit 13, the restoration unit 14, and the compensation unit 15 may be embodied as hardware, for example, by a processor. As an example of the processor, there may be exemplified a central processing unit (CPU), a digital signal processor (DSP), a field programmable gate array (FPGA), or the like. In addition, the division unit 11, the generation unit 12, the removal unit 13, the restoration unit 14, and the compensation unit 15 may be embodied by a large scale integrated circuit (LSI) including a processor and peripheral circuits. In addition, the division unit 11, the generation unit 12, the removal unit 13, the restoration unit 14, and the compensation unit 15 may be embodied by using a graphics processing unit (GPU), an application specific integrated circuit (ASIC), or the like.

The division unit 11 divides an image (hereinafter, sometimes referred to as an "input image") input to the image processing device 1 into an area (hereinafter, sometimes referred to as a "content area") where a content image exists and an area (hereinafter, sometimes referred to as a "background area") where no content image exists and information (hereinafter, sometimes referred to as "area information") indicating the content area and the background area to the generation unit 12. The input image is, for example, an image captured by a camera. Details of the process in the division unit 11 will be described later.

The generation unit 12 corrects pixels (hereinafter, sometimes referred to as "content area pixels") included in the content area by using pixels (hereinafter, sometimes referred to as "peripheral pixels") existing in the periphery of the content area among pixels (hereinafter, sometimes referred to as "background area pixels") included in the background area in the input image on the basis of area information. The generation unit 12 generates an image (hereinafter, sometimes referred to as a "background image") formed by the after-correction content area pixels (hereinafter, sometimes referred to as "corrected content area pixels") and the background area pixels by correcting the content area pixels by using the peripheral pixels. The generation unit 12 output the background image generated in this manner to the removal unit 13. In addition, the generation unit 12 outputs the corrected content area pixels to the compensation unit 15. Details of the process in the generation unit 12 will be described later.

The removal unit 13 removes the background image from the input image. The removal unit 13 outputs an image (hereinafter, sometimes referred to as a "removed image") obtained by removing the background image from the input image to the restoration unit 14. Details of the process in the removal unit 13 will be described later.

The restoration unit 14 detects an edge of the content image included in the removed image to restore the edge, so that the edge of the content image included in the removed image is emphasized. The restoration unit 14 outputs the removed image including the after-edge-restoration content image to the compensation unit 15. The detection of the edge in the content image may be performed by using, for example, a Sobel filter, a Prewitt filter, a LOG filter, a Canny method, or the like.

The compensation unit 15 compensates for gradation values of the content pixels forming the after-edge-restoration content image by using gradation values of the corrected content area pixels. The compensation unit 15 outputs the after-gradation-value-compensation image as an output image. Details of the process in the compensation unit 15 will be described later.

The image processing device 1 does not necessarily include the restoration unit 14, and in the image processing device 1, the removed image obtained by the removal unit 13 may be directly input to the compensation unit 15.

In addition, the input image may be an after-noise-removal input image. Noise removal may be performed by using, for example, a moving average filter, a Gaussian smoothing filter, or the like.

Operations of Image Processing Device

FIGS. 2 to 12 are diagrams illustrating operation examples of the image processing device according to the first embodiment. Among FIGS. 2 to 12, FIGS. 2, 4, 5, and 7 to 12 are schematic diagrams illustrating images.

Figure 2:
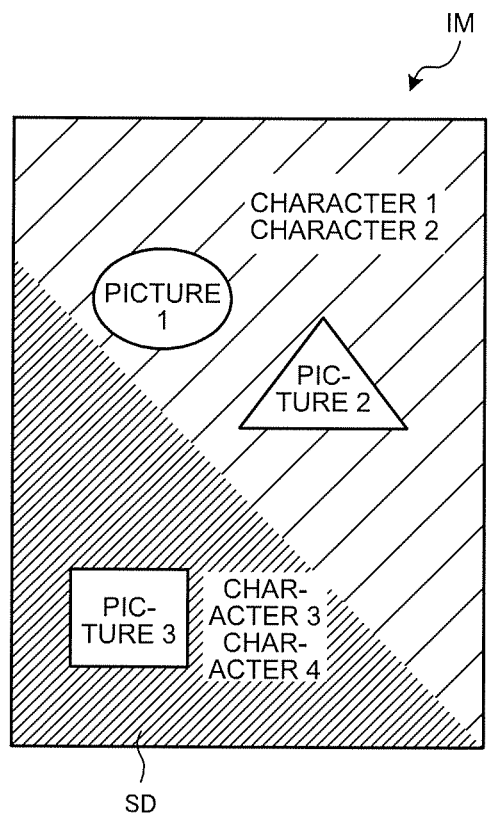
FIG. 2 is a diagram illustrating an operation example of the image processing device according to the first embodiment.

FIG. 2 illustrates the input image IM input to the image processing device 1. The input image IM as a content image includes, for example, Characters 1 to 4 and Pictures 1 to 3. In addition, for example, in the input image IM, a shadowed area (hereinafter, sometimes referred to as a "shadow area") SD exists.

Figure 3:
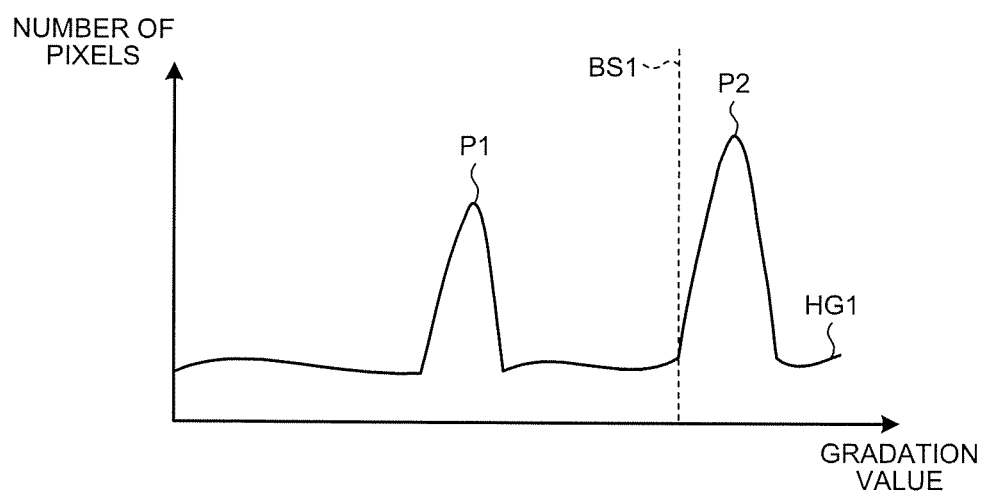
FIG. 3 is a diagram illustrating an operation example of the image processing device according to the first embodiment.

As illustrated in FIG. 3, the division unit 11 obtains a histogram HG1 of the entire input image IM and acquires peaks P1 and P2 of the histogram HG1. Next, the division unit 11 selects the peak positioned on the rightmost side in the histogram HG1, that is, the peak P2 which is a peak having the maximum gradation value among the acquired peaks P1 and P2. Next, the division unit 11 calculates a gradation value corresponding to a bottom edge of the histogram HG1 on the left side (namely, the side having a smaller gradation value) as viewed from the peak P2 as a first background slice BS1. For example, the division unit 11 may also calculate a gradation value that first reaches the number of pixels that is less than 1/N (N is an integer) of the number of pixels of the peak P2 as viewed on the left side from the peak P2 in the histogram HG1 as the bottom edge of the histogram HG1. In addition, for example, the division unit 11 may also calculate a gradation value of the point where a change in slope of the histogram HG1 is equal to or more than a threshold value as viewed on the left side from the peak P2 in the histogram HG1 as the bottom edge of the histogram HG1.

Figure 4:
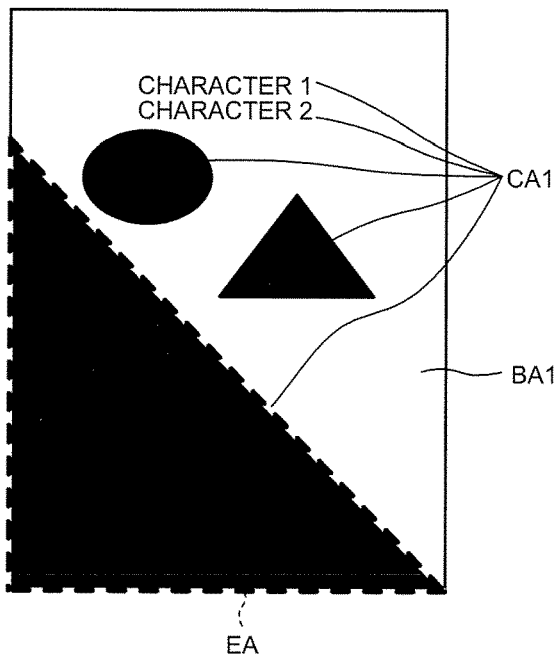
FIG. 4 is a diagram illustrating an operation example of the image processing device according to the first embodiment.

Next, as illustrated in FIG. 4, the division unit 11 binarizes the input image IM with reference to the first background slice BS1 and divides the input image IM into a first content area CA1 and a first background area BA1 according to the binarization of the input image IM. For example, in the input image IM, the division unit 11 binarizes the input image IM as the pixels having gradation values equal to or more than the first background slice BS1 as '0' and the pixels having gradation values less than the first background slice BS1 as '1'. In FIG. 4, the first content area CA1 is an area having the gradation values less than the first background slice BS1 according to the binarization with reference to the first background slice BS1 and corresponds to Characters 1 and 2, Pictures 1 and 2, and the shadow area SD. In addition, in FIG. 4, the first background area BA1 is an area having the gradation values equal to or more than the first background slice BS1 according to the binarization with reference to the first background slice BS1.

In this manner, the division unit 11 divides the input image IM into the first content area CA1 and the first background area BA1 on the basis of the peaks P1 and P2 of the histogram HG1 of the input image IM.

By doing so, it is possible to correctly divide the input image IM into the first content area CA1 and the first background area BA1.

Figure 5:
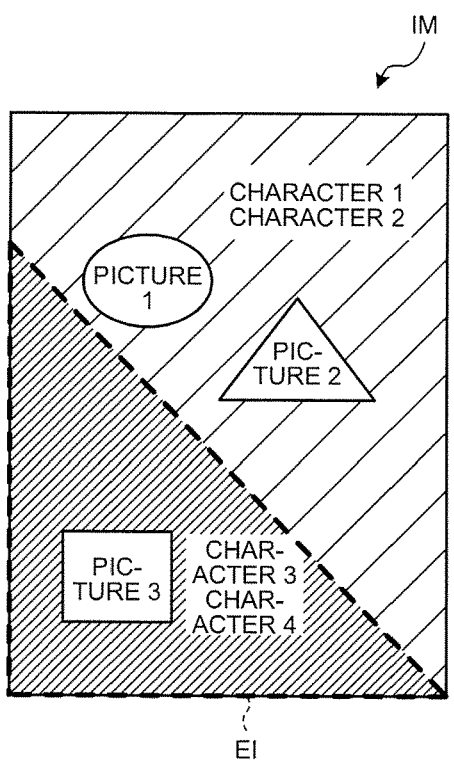
FIG. 5 is a diagram illustrating an operation example of the image processing device according to the first embodiment.

In addition, as illustrated in FIG. 4, in a case where an area (hereinafter, sometimes referred to as an "edge area") EA being in contact with an image edge of the input image IM exists in the first content area CA1, as illustrated in FIG. 5, the division unit 11 extracts an image (hereinafter, sometimes referred to as an "edge image") EI which exists in the edge area EA from the input image IM.

Figure 6:
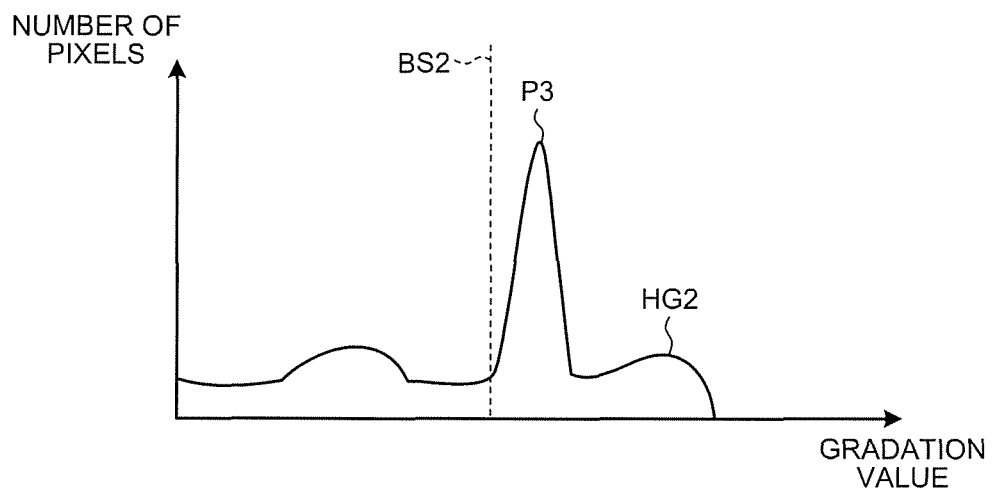
FIG. 6 is a diagram illustrating an operation example of the image processing device according to the first embodiment.

Next, as illustrated in FIG. 6, the division unit 11 obtains a histogram HG2 only in the edge image EI in the input image IM and acquires a peak P3 of the histogram HG2. Since only the peak P3 exists as the peak of the histogram HG2, next, the division unit 11 calculates a gradation value corresponding to a bottom edge of the histogram HG2 on the left side (namely, the side having a smaller gradation value) as viewed from the peak P3 as a second background slice BS2. For example, the division unit 11 may also calculate a gradation value that first reaches the number of pixels that is less than 1/N (N is an integer) of the number of pixels of the peak P3 as viewed on the left side from the peak P3 in the histogram HG2 as the bottom edge of the histogram HG2. In addition, for example, the division unit 11 may also calculate a gradation value of the point where a change in slope of the histogram HG2 is equal to or more than a threshold value as viewed on the left side from the peak P3 in the histogram HG2 as the bottom edge of the histogram HG2.

Figure 7:
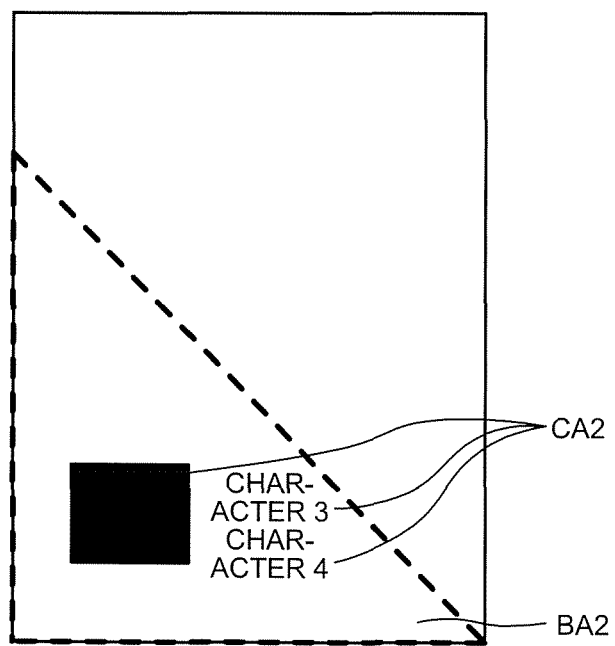
FIG. 7 is a diagram illustrating an operation example of the image processing device according to the first embodiment.

Next, as illustrated in FIG. 7, the division unit 11 binarizes the edge image EI with respect to the second background slice BS2 and divides the edge image EI into a second content area CA2 and a second background area BA2 according to the binarization of the edge image EI. For example, in the edge image EI, the division unit 11 binarizes the edge image EI as the pixels having gradation values equal to more than the second background slice BS2 as '0' and the pixels having gradation values less than the second background slice BS2 as '1'. In FIG. 7, the second content area CA2 is an area having the gradation values less than the second background slice BS2 According to the binarization with reference to the second background slice BS2 and corresponds to Characters 3 and 4 and Picture 3. In addition, in FIG. 7, the second background area BA2 is an area having the gradation values equal to or more than the second background slice BS2 according to the binarization with reference to the second background slice BS2.

In this manner, in a case where the edge area EA exist in the first content area CA1, the division unit 11 further divides the edge image EI into the second content area CA2 and the second background area BA2 on the basis of the peak P3 of the histogram HG2 of only the edge image EI in the input image IM.

By doing so, it is possible to correctly divide the edge image EI into the second content area CA2 and the second background area BA2 in the edge area EA corresponding to the shadow area SD. Therefore, the removal unit 13 can remove the shadow from the input image IM irrespective of the position of the shadow occurring in the input image IM.

Figure 8:
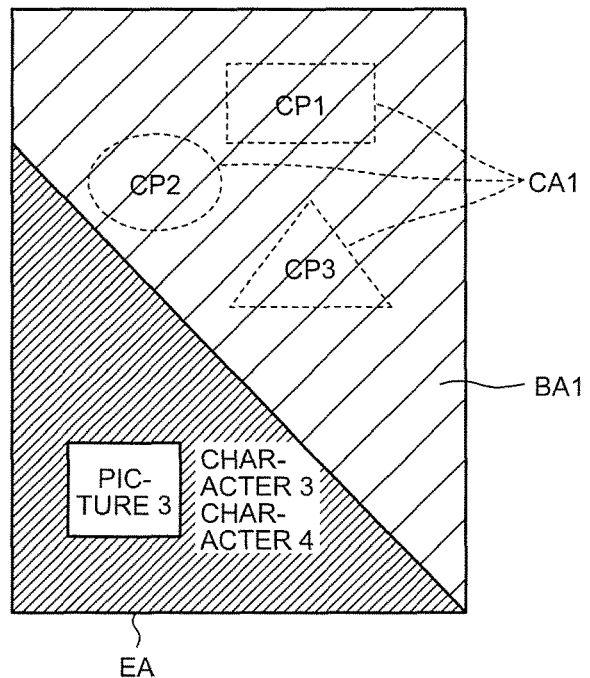
FIG. 8 is a diagram illustrating an operation example of the image processing device according to the first embodiment.
Figure 9:
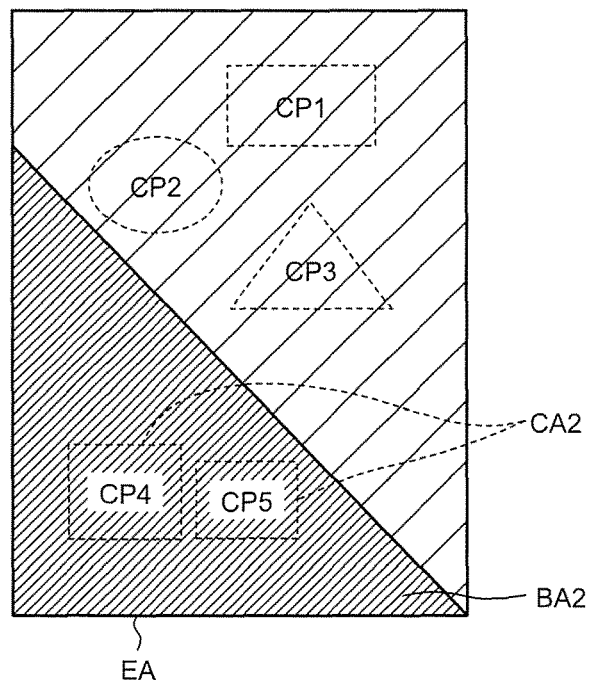
FIG. 9 is a diagram illustrating an operation example of the image processing device according to the first embodiment.

Next, as illustrated in FIG. 8, with respect to the area excluding the edge area EA of the input image IM, the generation unit 12 corrects first content area pixels included in the first content area CA1 by using first peripheral pixels existing in the vicinity of the first content area CA1 among first background area pixels included in the first background area BA1. By the correction, the generation unit 12 generates a first background image formed with first corrected content area pixels CP1, CP2, and CP3 and first background area pixels. In addition, in a case where the edge area EA exists in the input image IM, as illustrated in FIG. 9, with respect to the edge area EA, the generation unit 12 further corrects second content area pixels included in the second content area CA2 by using second peripheral pixels existing in the vicinity of the second content area CA2 among the second background area pixels included in the second background area BA2. By the correction, the generation unit 12 generates a second background image formed with second corrected content area pixels CP4 and CP5 and second background area pixels.

Figure 10:
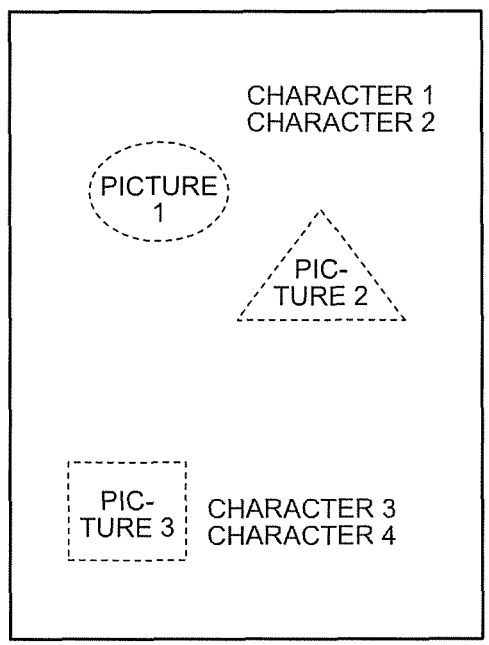
FIG. 10 is a diagram illustrating an operation example of the image processing device according to the first embodiment.

Next, the removal unit 13 removes the first background image from the input image IM. In addition, in a case where the edge area EA exist in the input image IM, the removal unit 13 further removes the second background image from the input image IM. A removed image obtained by removing the first background image and the second background image from the input image IM is illustrated in FIG. 10. The removed image illustrated in FIG. 10 includes content images of Characters 1 to 4 and Pictures 1 to 3. As a result of the removing process of the removal unit 13, in the removed image illustrated in FIG. 10, the gradation values of the pixels included in the area corresponding to the first background area BA1 and the second background area BA2 become the maximum gradation value of 255. Namely, as a result of the removing process of the removal unit 13, the background of the input image IM becomes white.

For example, the removal unit 13 obtains the gradation values of the removed image according to Mathematical Formula (1) every pixel between the input image IM and the first background image and between the input image IM and the second background image and acquires the removed image by subtracting the first background image and the second background image from the input image IM. In a case where a result of calculation of Mathematical Formula (1) is larger than 255, the gradation value of the removed image is set to 255, and in a case where a result of calculation Mathematical Formula (1) is smaller than 0, the gradation value of the removed image is set to 0.

Gradation value of removed image=255−{(255−Gradation value of input image)−(255−Gradation value of background image)}     (1)

In comparison with the input image IM, sometimes, in the removed image, the sharpness of the content image may be lost, and the color of the content image may light.

Figure 11:
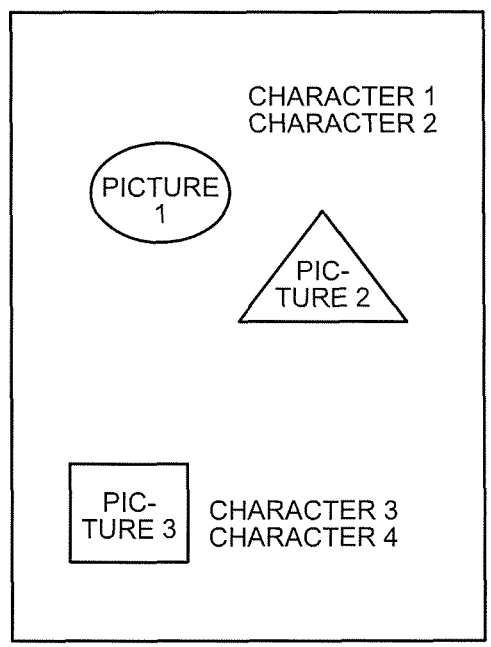
FIG. 11 is a diagram illustrating an operation example of the image processing device according to the first embodiment.

Therefore, the restoration unit 14 restores edges of Characters 1 to 4 and Pictures 1 to 3 that are the content images included in the removed image. The restoration unit 14 restores the edges of the content images, for example, by overlapping the previously-generated edge images on the removed image. By the restoration of the restoration unit 14, the sharpness of the content image is restored in the removed image. An after-edge-restoration content image is illustrated in FIG. 11.

In addition, the compensation unit 15 compensates for the gradation values of the content pixels forming Characters 1 and 2 in the after-edge-restoration content image by using the gradation values of the first corrected content area pixels CP1, compensates for the gradation values of the content pixels forming Picture 1 by using the gradation values of the first corrected content area pixels CP2, and compensates for the gradation values of the content pixels forming Picture 2 by using the gradation values of the first corrected content area pixels CP3. In addition, in a case where the edge area EA exists in the input image IM, the compensation unit 15 further compensates for the gradation values of the content pixels forming Picture 3 in the after-edge-restoration content image by using the gradation values of the second corrected content area pixels CP4 and compensates for the gradation values of the content pixels forming Characters 3 and 4 by using the gradation values of the second corrected content area pixels CP5.

Figure 12:
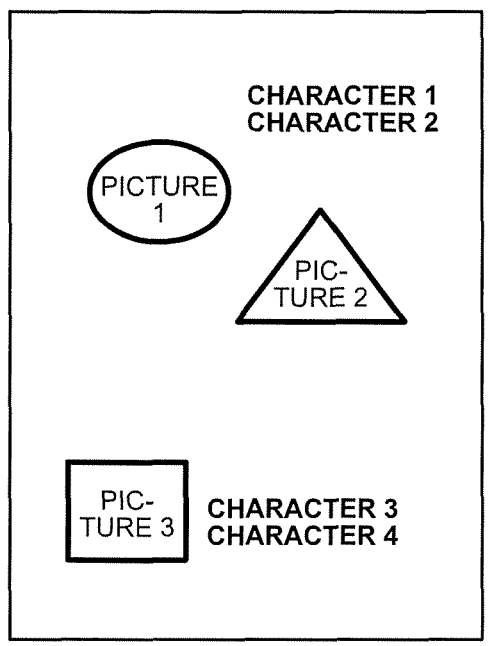
FIG. 12 is a diagram illustrating an operation example of the image processing device according to the first embodiment.

According to the compensation by the compensation unit 15, Characters 1 to 4 in the removed image are compensated for to be sharper, and the color tones of Pictures 1 to 3 are compensated for to be close to the color tone of the input image IM. An after-gradation-value-compensation image (that is, an output image) is illustrated in FIG. 12.

Operation of Generation Unit

FIGS. 13 to 18 are diagrams illustrating operation examples of the generation unit according to the first embodiment. Hereinafter, examples of the generation unit 12 will be described with reference to the following divided Operation Examples 1 to 8. Hereinafter, among the content area pixels, pixels which are to be corrected by the generation unit 12 are sometimes referred to as "target pixels".

Figure 13:
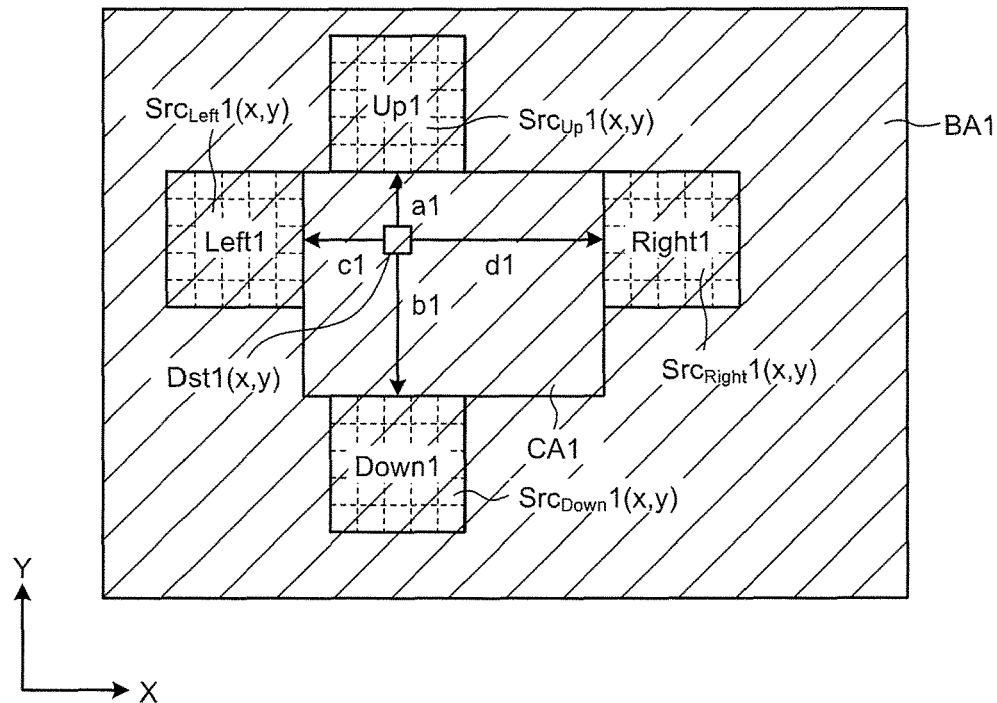
FIG. 13 is a diagram illustrating an operation example of a generation unit according to the first embodiment.

Operation Example 1: FIG. 13

Operation Example 1 is an operation example of a case where the first content area CA1 is surrounded by only the first background area BA1, and namely, an operation example of a case where the first peripheral pixels existing in the vicinity of the first content area CA1 are included in only the first background area BA1 and are not included in the second background area BA2.

In Operation Example 1, the generation unit 12 calculates first distances from the first target pixel $D_{st}1(x, y)$ to the boundary of the first content area CA1 among the first content area pixels included in the first content area CA1, namely, first distances a1, b1, c1, and d1 between the first target pixel $D_{st}1(x, y)$ and the first peripheral pixels adjacent to the first content area CA1. When the first target pixel $D_{st}1(x, y)$ is set as the origin, the first distance a1 is a distance in the +Y direction (upward direction), the first distance b1 is a distance in the −Y direction (downward direction), the first distance c1 is a distance in the −X direction (leftward direction), and the first distance d1 is a distance in the +X direction (rightward direction).

In addition, the generation unit 12 sets predetermined ranges adjacent to the first content area CA1 in the four directions of upward, downward, leftward, and rightward. In FIG. 13, the generation unit 12 set ranges of, for example, 5 pixels×5 pixels as the predetermined ranges Up1, Down1, Left1, and Right1.

The generation unit 12 calculates first average values $Src_{Up}1(x, y)$, $Src_{Down}1(x, y)$, $Src_{Left}1(x, y)$, and $Src_{Right}1(x, y)$ of the gradation values of a plurality of the first peripheral pixels included in the respective predetermined ranges Up1, Down1, Left1, and Right1 in the respective upward, downward, leftward, and rightward directions. $Src_{Up}1(x, y)$ is a first average value of the gradation values of the first peripheral pixels in the predetermined range Up1 in the upward direction, $Src_{Down}1(x, y)$ is a first average value of the gradation values of the first peripheral pixels in the predetermined range Down1 in the downward direction, $Src_{Left}1(x, y)$ is a first average value of the gradation values of the first peripheral pixels in the predetermined range Left1 in the leftward direction, and $Src_{Right}1(x, y)$ is a first average value of the gradation values of the first peripheral pixels in the predetermined range Right1 in the rightward direction.

The generation unit 12 corrects the gradation value of the first target pixel $D_{st}1(x, y)$ on the basis of the first distances a1, b1, c1, and d1 and the first average values $Src_{Up}1(x, y)$, $Src_{Down}1(x, y)$, $Src_{Left}1(x, y)$, and $Src_{Right}1(x, y)$ according to Mathematical Formula (2). The generation unit 12 sequentially sets each of all the first content area pixels included in the first content area CA1 as the first target pixel $D_{st}1(x, y)$ and corrects the gradation values of the first target pixel $D_{st}1(x, y)$ according to Mathematical Formula (2), so that all the first content area pixels included in the first content area CA1 are corrected.

$$\text{Graduation value of } D_{st}1(x, y) = \qquad (2)$$
$$\frac{a1 + b1 + c1 + d1}{(1/a1) + (1/b1) + (1/c1) + (1/d1)} \times$$
$$[\{1/a1 \times Src_{Up}1(x, y)\} + \{1/b1 \times Src_{Down}1(x, y)\} +$$
$$\{1/c1 \times Src_{Left}1(x, y)\} + \{1/d1 \times Src_{Right}1(x, y)\}]$$

In this manner, in Operation Example 1, the generation unit 12 corrects the first content area pixels by replacing the gradation values of the first content area pixels with weighted average values of the gradation values of the first peripheral pixels according to the first distances a1, b1, c1, and d1 between the first content area pixels and the first peripheral pixels.

By doing so, since it is possible to smoothly connect the color tone of the first content area CA1 after the correction of the first content area pixels and the color tone of the first background area BA1, it is possible to suppress unnatural connection in the boundary between the first content area CA1 after the correction of the first content area pixels and the first background area BA1.

In addition, at the time of correction of the first content area pixels, the generation unit 12 calculates the first average values of the gradation values of a plurality of the first peripheral pixels existing in the predetermined ranges Up1, Down1, Left1, and Right1 adjacent to the first content area CA1 and obtains weighted averages of the gradation values of the first peripheral pixels by using the calculated first average values.

By doing so, it is possible to further smoothly connect the color tone of the first content area CA1 after the correction of the first content area pixels and the color tone of the first background area BA1.

Figure 14:
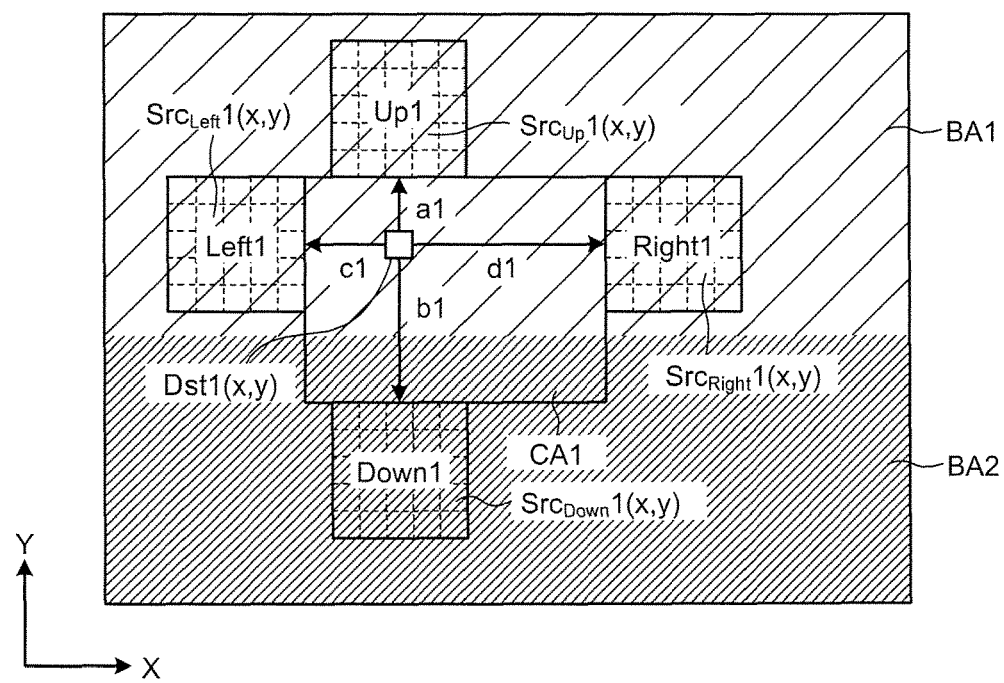
FIG. 14 is a diagram illustrating an operation example of the generation unit according to the first embodiment.

Operation Example 2: FIG. 14

Operation Example 2 is an example of a case where the first content area CA1 is surrounded by both of the first background area BA1 and the second background area BA2, and namely, an operation example of a case where the first peripheral pixels existing in the vicinity of the first content area CA1 are included in both of the first background area BA1 and the second background area BA2.

As illustrated in FIG. 14, Operation Example 2 is different from Operation Example 1 in that the entire predetermined range Down1 in the downward direction is included in the second background area BA2 (namely, the shadow area SD). The generation unit 12 corrects the gradation value of the first target pixel $D_{st}1(x, y)$ according to Mathematical Formula (3). In Mathematical Formula (3), the first distance b1 in the downward direction and the first average value $Src_{Down}1(x, y)$ in the downward direction do not exist. Therefore, the generation unit 12 calculates the first distances a1, c1, and d1 and the first average values $Src_{Up}1(x, y)$, $Src_{Left}1(x, y)$, and $Src_{Right}1(x, y)$, but it does not calculate the first distance b1 and the first average value $Src_{Down}1(x, y)$. Namely, Operation Example 2 is the same as Operation Example 1 in that the generation unit 12 corrects the gradation values of the first target pixel $D_{st}1(x, y)$ by using the 1 distances a1, c1, and d1 and the first average values $Src_{Up}1(x, y)$, $Src_{Left}1(x, y)$, and $Src_{Right}1(x, y)$, but it is different from Operation Example 1 in that the generation unit 12 corrects the gradation values of the first target pixel $D_{st}1(x, y)$ not by using the first distance b1 and the first average value $Src_{Down}1(x, y)$.

$$\text{Graduation value of } D_{st}1(x, y) = \quad (3)$$
$$\frac{a1 + c1 + d1}{(1/a1) + (1/c1) + (1/d1)} \times [\{1/a1 \times Src_{Up}1(x, y)\} +$$
$$\{1/c1 \times Src_{Left}1(x, y)\} + \{1/d1 \times Src_{Right}1(x, y)\}]$$

In this manner, in Operation Example 2, in a case where the first peripheral pixels are included in both of the first background area BA1 and the second background area BA2, the generation unit 12 corrects the first content area pixels by using the first peripheral pixels included in the first background area BA1 but not by using the first peripheral pixels included in the second background area BA2.

By doing so, even in a case where the first content area CA1 is surrounded by both of the first background area BA1 and the second background area BA2, it is possible to smoothly connect the color tone of the first content area CA1 after the correction of the first content area pixels and the color tone of the first background area BA1.

Figure 15:
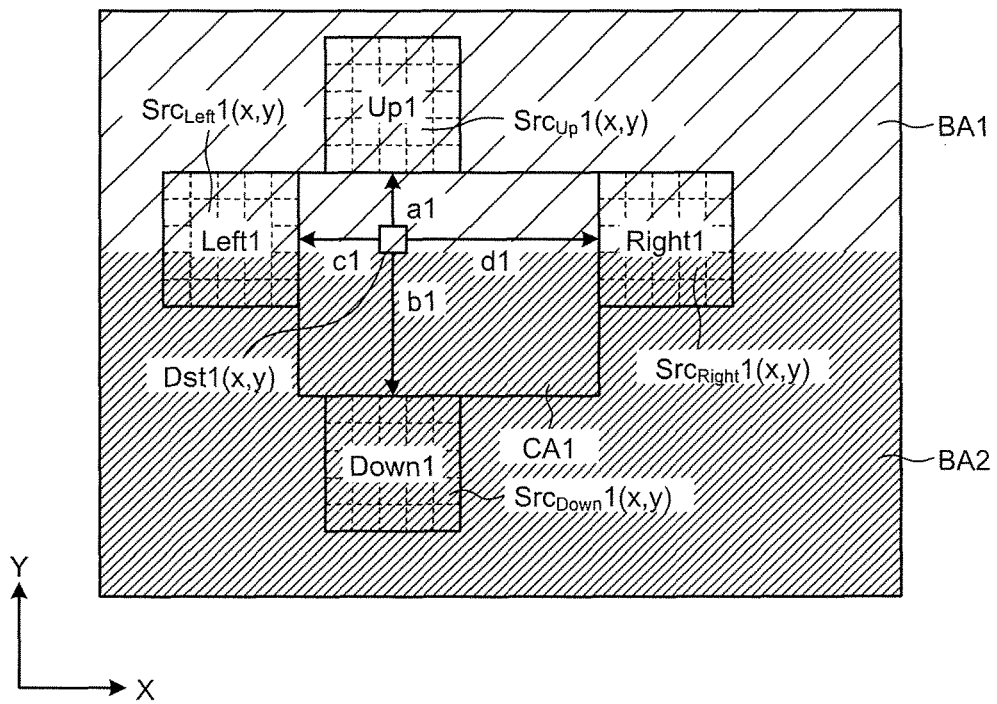
FIG. 15 is a diagram illustrating an operation example of the generation unit according to the first embodiment.

Operation Example 3: FIG. 15

Similarly to Operation Example 2, Operation Example 3 is an example of a case where the first content area CA1 is surrounded by both of the first background area BA1 and the second background area BA2, and namely, an operation example of a case where the first peripheral pixels existing in the vicinity of the first content area CA1 are included in both of the first background area BA1 and the second background area BA2.

As illustrated in FIG. 15, Operation Example 3 is different from Operation Example 1 in that the entire predetermined range Down1 in the downward direction is included in the second background area BA2 (namely, the shadow area SD) and a portion of the predetermined range Left1 in the leftward direction and a portion of the predetermined range Right1 in the rightward direction are included in the second background area BA2. Similarly to Operation Example 2, the generation unit 12 corrects the gradation value of the first target pixel $D_{st}1(x, y)$ according to the above-described Mathematical Formula (3). Operation Example 3 is different from Operation Example 2 in that, when the generation unit 12 calculates the first average value $Src_{Left}1(x, y)$ in the leftward direction and the first average value $Src_{Right}1(x, y)$ in the rightward direction, the generation unit uses the first peripheral pixels included in the first background area BA1, but it does not use the first peripheral pixels included in the second background area BA2.

In this manner, in Operation Example 3, similarly to Operation Example 2, in a case where the first peripheral pixels are included in both of the first background area BA1 and the second background area BA2, the generation unit 12 corrects the first content area pixels by using the first peripheral pixels included in the first background area BA1 but not by using the first peripheral pixels included in the second background area BA2.

Operation Example 4: FIG. 14 and FIG. 15

Similarly to Operation Example 2, Operation Example 4 is an example of a case where the first content area CA1 is surrounded by both of the first background area BA1 and the second background area BA2, and namely, an operation example of a case where the first peripheral pixels existing in the vicinity of the first content area CA1 are included in both of the first background area BA1 and the second background area BA2.

Operation Example 4 is different from Operation Example 1 in that the generation unit 12 corrects the gradation value of the first target pixel $D_{st}1(x, y)$ according to Mathematical Formula (4). In Mathematical Formula (4), $W_{Up}1$ is a weighted value with respect to the first average value $Src_{Up}1(x, y)$ in the upward direction, $W_{Down}1$ is a weighted value with respect to the first average value $Src_{Down}1(x, y)$ in the downward direction, $W_{Left}1$ is a weighted value with respect to the first average value $Src_{Left}1(x, y)$ in the leftward direction, and $W_{Right}1$ is a weighted value with respect to the first average value $Src_{Right}1(x, y)$ in the rightward direction.

$$\text{Graduation value of } D_{st}1(x, y) = \quad (4)$$
$$\frac{a1 + b1 + c1 + d1}{(1/a1) + (1/b1) + (1/c1) + (1/d1)} \times$$
$$[\{W_{Up}1/a1 \times Src_{Up}1(x, y)\} + \{W_{Down}1/b1 \times Src_{Down}1(x, y)\} +$$
$$\{W_{Left}1/c1 \times Src_{Left}1(x, y)\} + \{W_{Right}1/d1 \times Src_{Right}1(x, y)\}]$$

For example, as illustrated in FIG. 14, in a case where the entire predetermined range Up1 in the upward direction, the entire predetermined range Left1 in the leftward direction, and the entire predetermined range Right1 in the rightward direction are included in the first background area BA1 and the entire predetermined range Down1 in the downward direction is included in the second background area BA2, the generation unit 12 sets the values of $W_{Up}1$, $W_{Left}1$, and $W_{Right}1$ to be larger than the value of $W_{Down}1$ in Mathematical Formula (4) ($W_{Up}1$, $W_{Left}1$, $W_{Right}1 > W_{Down}1$).

In addition, for example, as illustrated in FIG. 15, in a case where the entire predetermined range Up1 in the upward direction is included in the first background area BA1, the entire predetermined range Down1 in the downward direction is included in the second background area BA2, and a portion of the predetermined range Left1 in the leftward direction and a portion of the predetermined range Right1 in the rightward direction are included in the second background area BA2, the generation unit 12 sets the values of $W_{Up}1$, $W_{Left}1$, and $W_{Right}1$ to be larger than the value of $W_{Down}1$ and sets the value of $W_{Up}1$ to be larger than the values of $W_{Left1}$ and $W_{Right}1$ ($W_{Up}1 > W_{Left}1$, $W_{Right}1 > W_{Down}1$) in Mathematical Formula (4).

In this manner, in Operation Example 4, in a case where the first peripheral pixels are included in both of the first background area BA1 and the second background area BA2, the generation unit 12 sets a weighting factor of the gradation values of the first peripheral pixels included in the first background area BA1 to be larger than a weighting factor of the gradation values of the first peripheral pixels included in the second background area BA2 and corrects the first content area pixels by replacing the gradation values of the first content area pixels with weighted average values of the gradation values of the first peripheral pixels according to the first distances a1, b1, c1, and d1 between the first content area pixels and the first peripheral pixels.

By doing so, in a case where the first content area CA1 is surrounded by both of the first background area BA1 and the second background area BA2, by the correction of the first content area pixels, it is possible to allow a degree of influence of the first peripheral pixels included in the first background area BA1 to be larger than a degree of influence of the first peripheral pixels included in the second background area BA2. Therefore, it is possible to suppress a change in color tone in the boundary between the first content area CA1 after the correction of the first content area pixels and the first background area BA1.

Heretofore, Operation Examples 1 to 4 are described.

Next, Operation Examples 5 to 8 will be described. Operation Examples 5 to 8 are operation examples of a case where the edge area EA exists in the first content area CA1.

Figure 16:
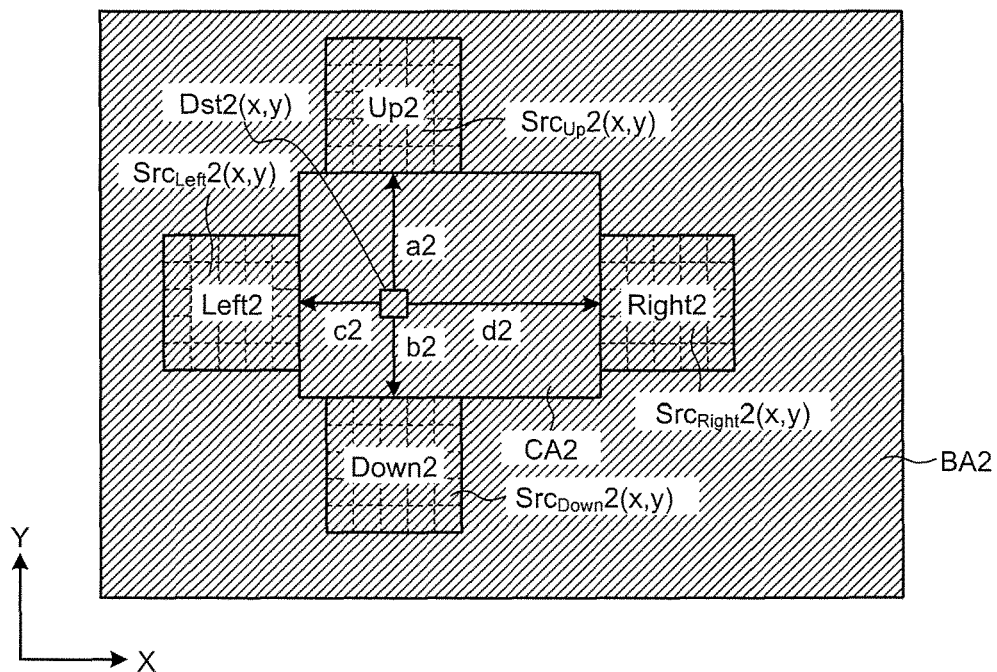
FIG. 16 is a diagram illustrating an operation example of the generation unit according to the first embodiment.

Operation Example 5: FIG. 16

Operation Example 5 is an operation example of a case where the second content area CA2 is surrounded by only the second background area BA2, and namely, an operation example of a case where the second peripheral pixels existing in the vicinity of the second content area CA2 are included in only the second background area BA2 and are not included in the first background area BA1.

In Operation Example 5, the generation unit 12 calculates second distances from the second target pixel $D_{st}2(x, y)$ to the boundary of the second content area CA2 among the second content area pixels included in the second content area CA2, namely, second distances a2, b2, c2, and d2 between the second target pixel $D_{st}2(x, y)$ and the second peripheral pixels adjacent to the second content area CA2. When the second target pixel $D_{st}2(x, y)$ is set as the origin, the second distance a2 is a distance in the +Y direction (upward direction), the second distance b2 is a distance in the −Y direction (downward direction), the second distance c2 is a distance in the −X direction (leftward direction), and the second distance d2 is a distance in the +X direction (rightward direction).

In addition, the generation unit 12 sets predetermined ranges adjacent to the second content area CA2 in the four directions of upward, downward, leftward, and rightward. In FIG. 16, the generation unit 12 set ranges of, for example, 5 pixels×5 pixels as the predetermined ranges Up2, Down2, Left2, and Right2.

The generation unit 12 generates second average values $Src_{Up}2(x, y)$, $Src_{Down}2(x, y)$, $Src_{Left}2(x, y)$, and $Src_{Right}2(x, y)$ of the gradation values of a plurality of the second peripheral pixels included in the respective predetermined ranges Up2, Down2, Left2, and Right2 in the respective upward, downward, leftward, and rightward directions. $Src_{Up}2(x, y)$ is a second average value of the gradation values of the second peripheral pixels in the predetermined range Up2 in the upward direction, $Src_{Down}2(x, y)$ is a second average value of the gradation values of the second peripheral pixels in the predetermined range Down2 in the downward direction, $Src_{Left}2(x, y)$ is a second average value of the gradation values of the second peripheral pixels in the predetermined range Left2 in the leftward direction, and $Src_{Right}2(x, y)$ is a second average value of the gradation values of the second peripheral pixels in the predetermined range Right2 in the rightward direction.

The generation unit 12 corrects the gradation values of the second target pixel $D_{st}2(x, y)$ on the basis of the second distances a2, b2, c2, and d2 and the second average values $Src_{Up}2(x, y)$, $Src_{Down}2(x, y)$, $Src_{Left}2(x, y)$, and $Src_{Right}2(x, y)$ according to Mathematical Formula (5). The generation unit 12 sequentially sets each of all the second content area pixels included in the second content area CA2 as the second target pixel $D_{st}2(x, y)$ and corrects the gradation values of the second target pixel $D_{st}2(x, y)$ according to Mathematical Formula (5), so that all the second content area pixels included in the second content area CA2 are corrected.

$$\text{Graduation value of } D_{st}2(x, y) = \frac{a2 + b2 + c2 + d2}{(1/a2) + (1/b2) + (1/c2) + (1/d2)} \times \qquad (5)$$
$$[\{1/a2 \times Src_{Up}2(x, y)\} + \{1/b2 \times Src_{Down}2(x, y)\} +$$
$$\{1/c2 \times Src_{Left}2(x, y)\} + \{1/d2 \times Src_{Right}2(x, y)\}]$$

In this manner, in Operation Example 5, the generation unit 12 corrects the second content area pixels by replacing the gradation values of the second content area pixels with weighted average values of the gradation values of the second peripheral pixels according to the second distances a2, b2, c2, and d2 between the second content area pixels and the second peripheral pixels.

By doing so, since it is possible to smoothly connect the color tone of the second content area CA2 after the correction of the second content area pixels and the color tone of the second background area BA2, it is possible to suppress unnatural connection in the boundary between the second content area CA2 after the correction of the second content area pixels and the second background area BA2.

In addition, at the time of correction of the second content area pixels, the generation unit 12 calculates the second average values of the gradation values of a plurality of the second peripheral pixels existing in the predetermined ranges Up2, Down2, Left2, and Right2 adjacent to the second content area CA2 and obtains weighted averages of the gradation values of the second peripheral pixels by using the calculated second average values.

By doing so, it is possible to further smoothly connect the color tone of the second content area CA2 after the correction of the second content area pixels and the color tone of the second background area BA2.

Figure 17:
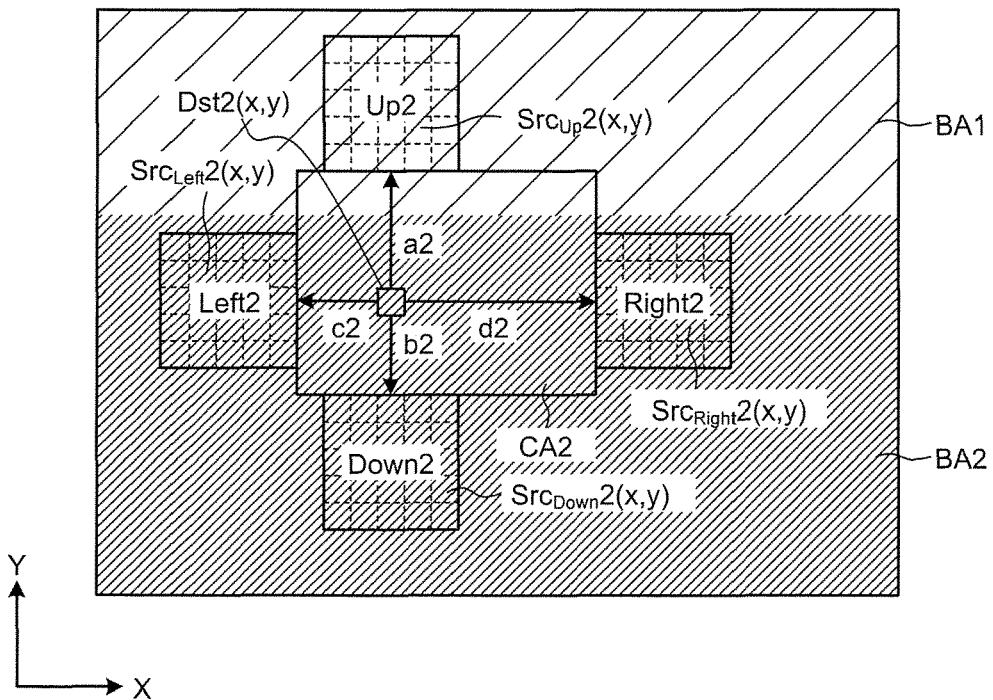
FIG. 17 is a diagram illustrating an operation example of the generation unit according to the first embodiment.

Operation Example 6: FIG. 17

Operation Example 6 is an example of a case where the second content area CA2 is surrounded by both of the first background area BA1 and the second background area BA2, and namely, an operation example of a case where the second peripheral pixels existing in the vicinity of the second content area CA2 are included in both of the first background area BA1 and the second background area BA2.

As illustrated in FIG. 17, Operation Example 6 is different from Operation Example 5 in that the entire predetermined range Up2 in the upward direction is included in the first background area BA1. The generation unit 12 corrects the gradation value of the second target pixel $D_{st}2(x, y)$ according to Mathematical Formula (6). In Mathematical Formula (6), the second distance a2 in the upward direction and the second average value $Src_{Up}2(x, y)$ in the upward direction do not exist. Therefore, the generation unit 12 calculates the second distances b2, c2, and d2 and the second average value $Src_{Down}2(x, y)$, $Src_{Left}2(x, y)$, and $Src_{Right}2(x, y)$, but it does not calculates the second distance a2 and the second average value $Src_{Up}2(x, y)$. Namely, Operation Example 6 is the same as Operation Example 2 in that the generation unit 12 corrects the gradation value of the second target pixel $D_{st}2(x, y)$ by using the second distances b2, c2, and d2 and the second average values $Src_{Down}2(x, y)$, $Src_{Left}2(x, y)$, and $Src_{Right}2(x, y)$, but it is different from Operation Example 5 in that the generation unit 12 corrects the gradation value of the second target pixel $D_{st}2(x, y)$ not by using the second distance a2 and the second average value $Src_{Up}2(x, y)$.

$$\text{Graduation value of } D_{st}2(x, y) = \qquad (6)$$
$$\frac{a2 + c2 + d2}{(1/a2) + (1/c2) + (1/d2)} \times [\{1/b2 \times Src_{Down}2(x, y)\} +$$
$$\{1/c2 \times Src_{Left}2(x, y)\} + \{1/d2 \times Src_{Right}2(x, y)\}]$$

In this manner, in Operation Example 6, in a case where the second peripheral pixels are included in both of the first background area BA1 and the second background area BA2, the generation unit 12 corrects the second content area pixels by using the second peripheral pixels included in the second background area BA2 but not by using the second peripheral pixels included in the first background area BA1.

By doing so, even in a case where the second content area CA2 is surrounded by both of the first background area BA1 and the second background area BA2, it is possible to smoothly connect the color tone of the second content area CA2 after the correction of the second content area pixels and the color tone of the second background area BA2.

Figure 18:
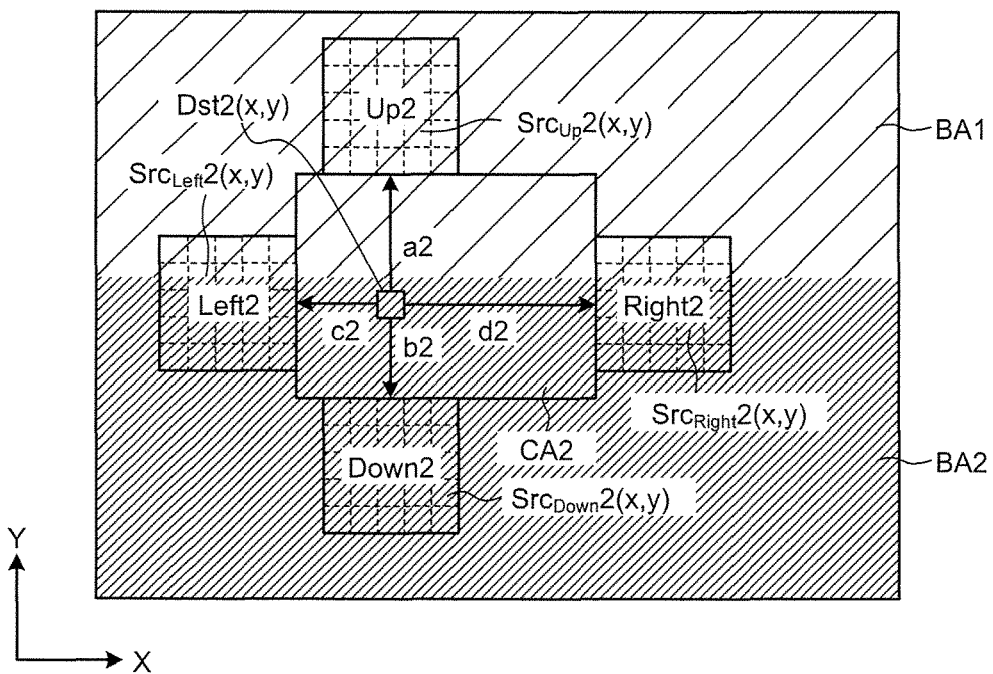
FIG. 18 is a diagram illustrating an operation example of the generation unit according to the first embodiment.

Operation Example 7: FIG. 18

Similarly to Operation Example 6, Operation Example 7 is an example of a case where the second content area CA2 is surrounded by both of the first background area BA1 and the second background area BA2, and namely, an operation example of a case where the second peripheral pixels existing in the vicinity of the second content area CA2 are included in both of the first background area BA1 and the second background area BA2.

As illustrated in FIG. 18, Operation Example 7 is different from Operation Example 5 in that the entire predetermined range Up2 in the upward direction is included in the first background area BA1 and a portion of the predetermined range Left2 in the leftward direction and a portion of the predetermined range Right2 in the rightward direction are included in the first background area BA1. Similarly to Operation Example 6, the generation unit 12 corrects the gradation value of the second target pixel $D_{st}2(x, y)$ according to the above-described Mathematical Formula (6). Operation Example 7 is different from Operation Example 6 in that, when the generation unit 12 calculates the second average value $Src_{Left}2(x, y)$ in the leftward direction and the second average value $Src_{Right}2(x, y)$ in the rightward direction, the generation unit uses the second peripheral pixels included in the second background area BA2, but it does not use the second peripheral pixels included in the first background area BA1.

In this manner, in Operation Example 7, similarly to Operation Example 6, in a case where the second peripheral pixels are included in both of the first background area BA1 and the second background area BA2, the generation unit 12 corrects the second content area pixels by using the second peripheral pixels included in the second background area BA2 but not by using the second peripheral pixels included in the first background area BA1.

Operation Example 8: FIG. 17 and FIG. 18

Similarly to Operation Example 6, Operation Example 8 is an example of a case where the second content area CA2 is surrounded by both of the first background area BA1 and the second background area BA2, and namely, an operation example of a case where the second peripheral pixels existing in the vicinity of the second content area CA2 are included in both of the first background area BA1 and the second background area BA2.

Operation Example 8 is different from Operation Example 5 in that, the generation unit 12 corrects the gradation value of the second target pixel $D_{st}2(x, y)$ according to Mathematical Formula (7). In Mathematical Formula (7), $W_{Up}2$ is a weighted value with respect to the second average value $Src_{Up}2(x, y)$ in the upward direction, $W_{Down}2$ is a weighted value with respect to the second average value $Src_{Down}2(x, y)$ in the downward direction, $W_{Left}2$ is a weighted value with respect to the second average value $Src_{Left}2(x, y)$ in the leftward direction, and $W_{Right}2$ is a weighted value with respect to the second average value $Src_{Right}2(x, y)$ in the rightward direction.

$$\text{Graduation value of } D_{st}2(x, y) = \qquad (7)$$
$$\frac{a2 + b2 + c2 + d2}{(1/a2) + (1/b2) + (1/c2) + (1/d2)} \times$$
$$[\{W_{Up}2/a2 \times Src_{Up}2(x, y)\} + \{W_{Down}2/b2 \times Src_{Down}2(x, y)\} +$$
$$\{W_{Left}2/c2 \times Src_{Left}2(x, y)\} + \{W_{Right}2/d2 \times Src_{Right}2(x, y)\}]$$

For example, as illustrated in FIG. 17, in a case where the entire predetermined range Down2 in the downward direction, the entire predetermined range Left2 in the leftward direction, and the entire predetermined range Right2 in the rightward direction are included in the second background area BA2 and the entire predetermined range Up2 in the upward direction is included in the first background area BA1, the generation unit 12 sets the values of $W_{Down}2$, $W_{Left}2$, and $W_{Right}2$ to be larger than the value of $W_{Up}2$ ($W_{Down}2$, $W_{Left}2$, $W_{Right}2 > W_{Up}2$) in Mathematical Formula (7).

In addition, for example, as illustrated in FIG. 18, in a case where the entire predetermined range Down2 in the downward direction is included in the second background area BA2, the entire predetermined range Up2 in the upward direction is included in the first background area BA1, and a portion of the predetermined range Left2 in the leftward direction and a portion of the predetermined range Right2 in the rightward direction are included in the first background area BA1, the generation unit 12 sets the values of $W_{Down}2$, $W_{Left}2$, and $W_{Right}2$ to be larger than the value of $W_{Up}2$ and sets the value of $W_{Down}2$ to be larger than the values of $W_{Left}2$ and $W_{Right}2$ ($W_{Down}2 > W_{Left}2$, $W_{Right}2 > W_{Up}2$) in Mathematical Formula (7).

In this manner, in Operation Example 8, in a case where the second peripheral pixels are included in both of the first background area BA1 and the second background area BA2, the generation unit 12 sets a weighting factor of the gradation values of the second peripheral pixels included in the second background area BA2 to be larger than a weighting factor of the gradation values of the second peripheral pixels included in the first background area BA1 and corrects the second content area pixels by replacing the gradation values of the second content area pixels with weighted average values of the gradation values of the second peripheral pixels according to the second distances a2, b2, c2, and d2 between the second content area pixels and the second peripheral pixels.

By doing so, in a case where the second content area CA2 is surrounded by both of the first background area BA1 and the second background area BA2, by the correction of the second content area pixels, it is possible to allow a degree of influence of the second peripheral pixels included in the second background area BA2 to be larger than a degree of influence of the second peripheral pixels included in the first background area BA1. Therefore, it is possible to suppress a change in color tone in the boundary between the second content area CA2 after the correction of the second content area pixels and the second background area BA2.

Operation of Compensation Unit

Figure 19:
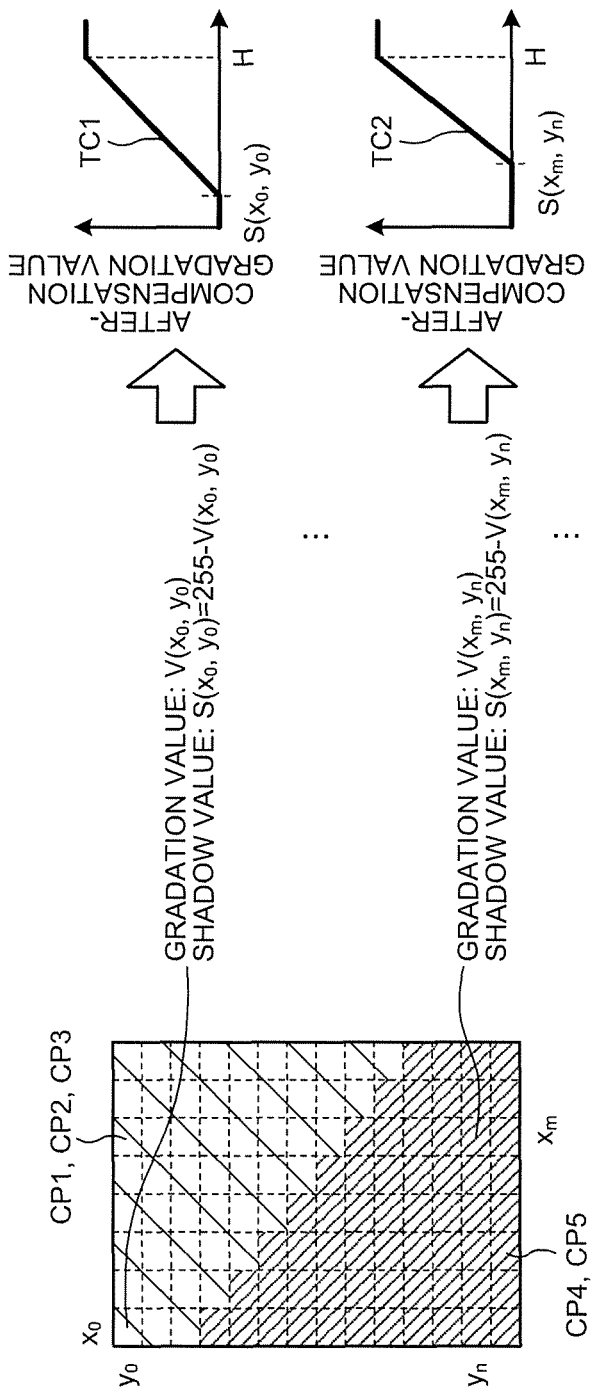
FIG. 19 is a diagram illustrating an operation example of a compensation unit according to the first embodiment.

FIG. 19 is a diagram illustrating an operation example of the compensation unit according to the first embodiment. In FIG. 19, $V(x_0, y_0)$ are gradation values of the first corrected content area pixel CP1, CP2, and CP3, and $V(x_m, y_n)$ are gradation values of the second corrected content area pixel CP4 and CP5.

The compensation unit 15 calculates shadow values $S(x_0, y_0)$ of the first corrected content area pixel CP1, CP2, and CP3 by subtracting the gradation values $V(x_0, y_0)$ from the maximum gradation value of 255. Next, the compensation unit 15 generates a tone curve TC1 illustrated in FIG. 19 on the basis of the calculated shadow values $S(x_0, y_0)$. Highlight H in FIG. 19 is set, for example, as 242 that is the value of 95% of the maximum gradation value of 255. The compensation unit 15 calculates after-compensation gradation values of first content pixels by applying the tone curve TC1 to the gradation values of the first content pixels forming a first content image (namely, a content image of Characters 1 and 2 and Pictures 1 and 2 illustrated in FIG. 10) included in a first removed image obtained by the removal unit 13 removing the first background image from the input image IM. With respect to all the first content pixels, the compensation unit 15 calculates the after-compensation gradation value for every first content pixel by using the tone curve TC1. Namely, the compensation unit 15 compensates for the gradation values of the first content pixels forming a first content image included in the first removed image obtained by the removal unit 13 removing the first background image from the input image IM by using the gradation values of first corrected content area pixels.

In addition, in a case where the edge area EA exists in the input image IM, the compensation unit 15 calculates shadow values $S(x_m, y_n)$ of the second corrected content area pixels CP4 and CP5 by subtracting the gradation values $V(x_m, y_n)$ from the maximum gradation value of 255. Next, the compensation unit 15 generates a tone curve TC2 illustrated in FIG. 19 on the basis of the calculated shadow values $S(x_m, y_n)$. In general, since the gradation value $V(x_0, y_0)$ is larger than the gradation value $V(x_m, y_n)$, the slop of the tone curve TC2 is larger than the slope of the tone curve TC1. The compensation unit 15 calculates after-compensation gradation values of the second content pixels by applying the tone curve TC2 to the gradation values of the second content pixels forming a second content image (namely, a content image of Characters 3 and 4 and Picture 3 illustrated in FIG. 10) included in a second removed image obtained by the removal unit 13 removing the second background image from the input image IM. With respect to all the second content pixels, the compensation unit 15 calculates the after-compensation gradation value for every second content pixel by using the tone curve TC2. Namely, the compensation unit 15 compensates for the gradation values of the second content pixels forming a second content image included in the second removed image obtained by the removal unit 13 removing the second background image from the input image IM by using the gradation values of the second corrected content area pixels.

According to the compensation of the compensation unit 15, since the gradation values in the content area are decreased by an amount increased according to the removal of the background image, it is possible to compensate for the color tone of the content image so as to be close to the color tone of the input image IM.

Processes of Image Processing Device

Figure 20:
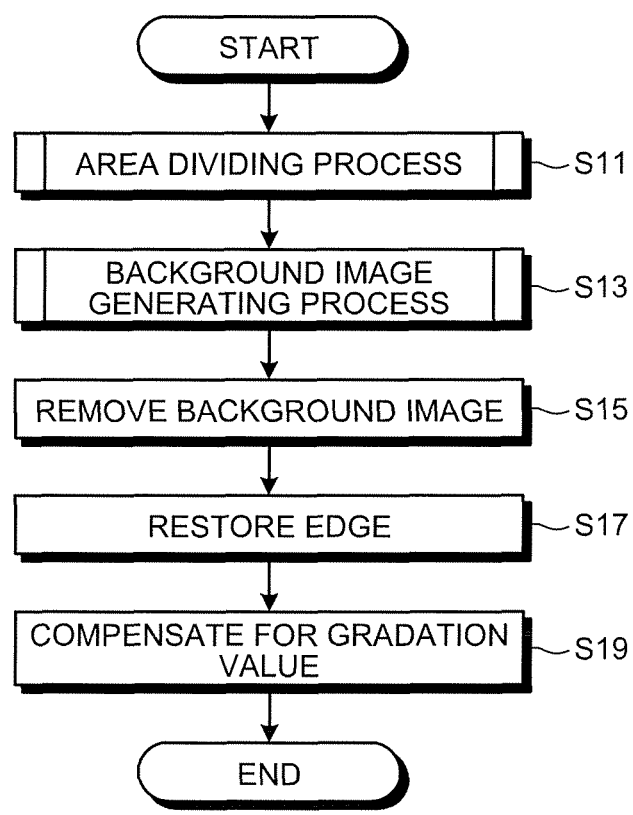
FIG. 20 is a flowchart illustrating a process example of the image processing device according to the first embodiment.

FIG. 20 is a flowchart illustrating a process example of the image processing device according to the first embodiment.

Figure 21:
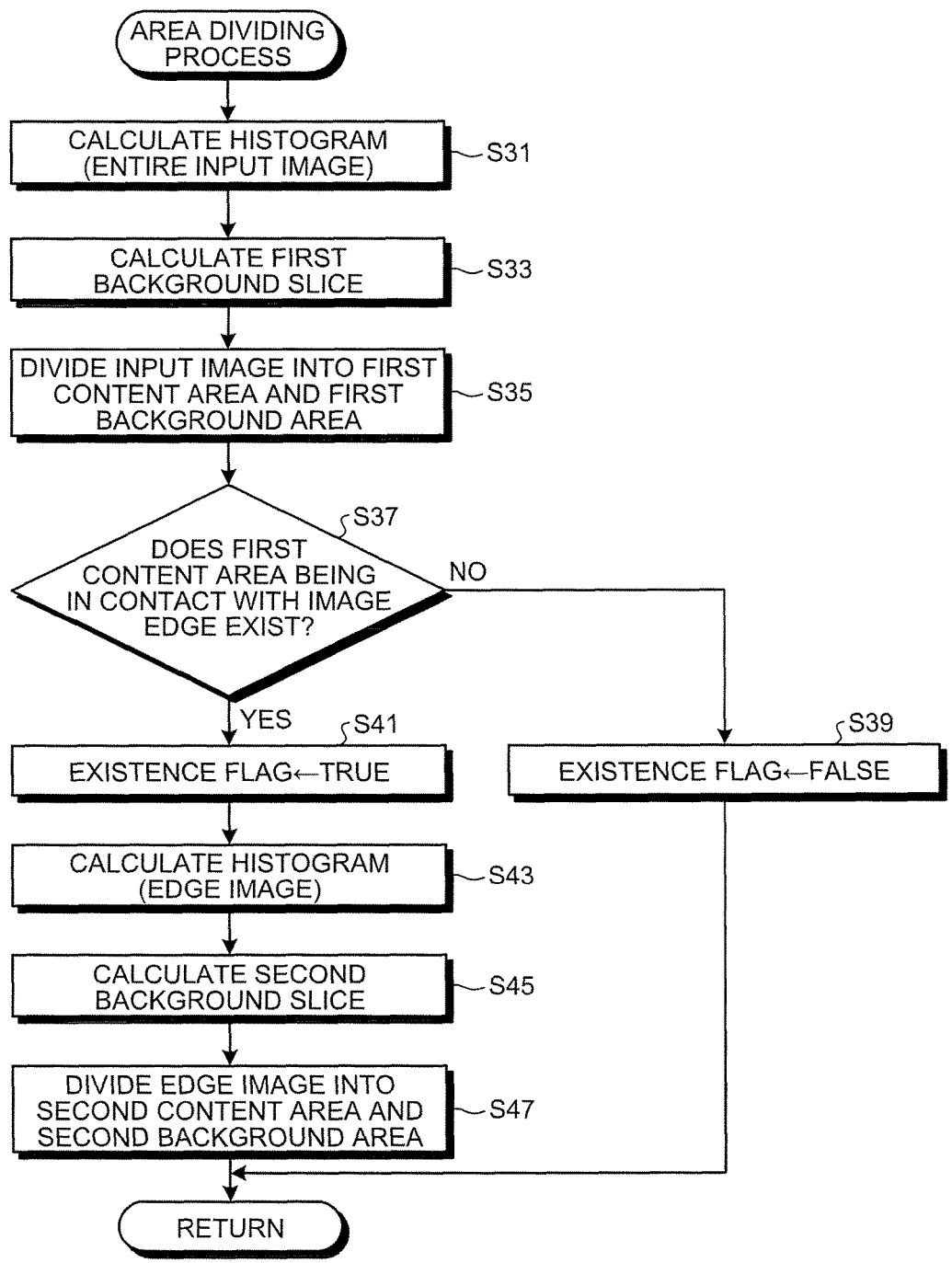
FIG. 21 is a flowchart illustrating an example of an area dividing process according to the first embodiment.

In FIG. 20, in step S11, the division unit 11 performs an area dividing process. FIG. 21 is a flowchart illustrating an example of the area dividing process according to the first embodiment.

In FIG. 21, in step S31, the division unit 11 obtains a histogram HG1 in the entire input image IM.

Next, in step S33, the division unit 11 calculates a first background slice BS1 on the basis of peaks of the histogram HG1.

Next, in step S35, the division unit 11 divides the input image IM into a first content area CA1 and a first background area BA1 on the basis of the first background slice BS1.

Next, in step S37, the division unit 11 determines whether or not a first content area CA1 being in contact with an image edge of the input image IM exists. In a case where the first content area CA1 being in contact with the image edge of the input image IM does not exist (No in step S37), the process proceeds to step S39, and in a case where the first content area CA1 being in contact with the image edge of the input image IM exists (Yes in step S37), the process proceeds to step S41.

In step S39, the division unit 11 sets an existence flag to FALSE. By the process in step S39, the area dividing process is ended.

On the other hand, in step S41, the division unit 11 sets the existence flag to TRUE.

Next, in step S43, the division unit 11 obtains a histogram HG2 in only the edge image EI in the input image IM.

Next, in step S45, the division unit 11 calculates a second background slice BS2 on the basis of peaks of the histogram HG2.

Next, in step S47, the division unit 11 divides the edge image EI into a second content area CA2 and a second background area BA2 on the basis of the second background slice BS2. By the process in step S47, the area dividing process is ended.

Figure 22:
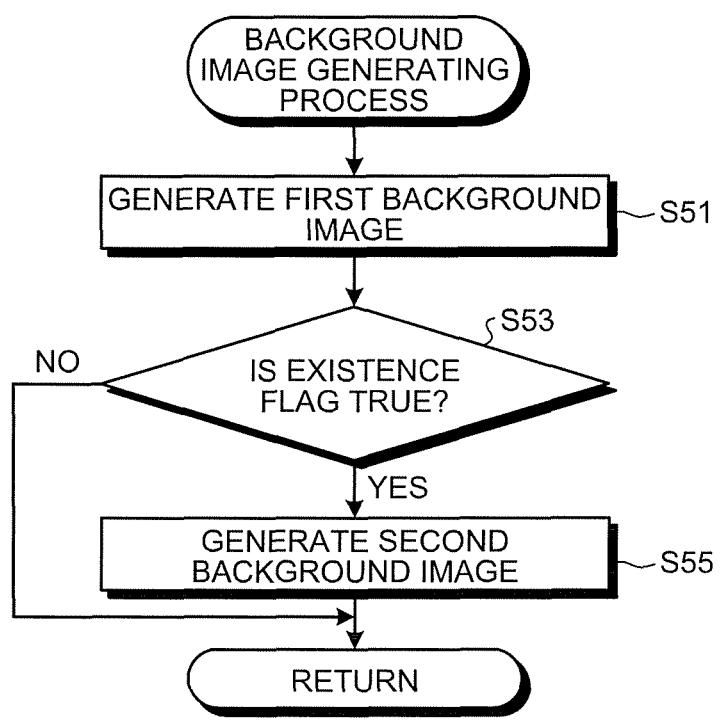
FIG. 22 is a flowchart illustrating an example of a background image generating process according to the first embodiment.

Returning to FIG. 20, in step S13, the generation unit 12 performs a background image generating process. FIG. 22 is a flowchart illustrating an example of the background image generating process according to the first embodiment.

In FIG. 22, in step S51, the generation unit 12 generates a first background image by correcting first content area pixels included in the first content area CA1 by using first peripheral pixels existing in the vicinity of the first content area CA1.

Next, in step S53, the generation unit 12 determines whether or not the existence flag is TRUE.

In a case where the existence flag is TRUE (Yes in step S53), the process proceeds to step S55, and in step S55, the generation unit 12 generates a second background image by correcting second content area pixels included in the second content area CA2 by using second peripheral pixels existing in the vicinity of the second content area CA2. By the process in step S55, the background image generating process is ended.

On the other hand, in a case where the existence flag is not TRUE, namely, in a case where the existence flag is FALSE (No in step S53), without performing the process in step S55, the background image generating process is ended.

Returning to FIG. 20, in step S15, the removal unit 13 removes the first background image from the input image IM. In addition, in a case where the existence flag is TRUE, the removal unit 13 further removes the second background image from the input image IM.

Next, in step S17, the restoration unit 14 restores an edge of a content image included in a removed image.

Next, in step S19, the compensation unit 15 compensates for gradation values of an after-edge-restoration content image.

As described above, in the first embodiment, the image processing device 1 is configured to include the division unit 11, the generation unit 12, and the removal unit 13. The division unit 11 divides the input image IM into the first content area CA1 and the first background area BA1. The generation unit 12 corrects the first content area pixels included in the first content area CA1 by using the first peripheral pixels existing in the vicinity of the first content area CA1 among the first background area pixels included in the first background area BA1. By the correction, the generation unit 12 generates the first background image formed with the after-correction first content area pixels and the first background area pixels. The removal unit 13 removes the first background image from the input image IM.

By doing so, since the background except for the content in the input image IM becomes white, the content are emphasized as contrasted with the background, and thus, it is possible to improve a degree of recognition for the content in the input image IM. Therefore, for example, in a case where the content is a character, accuracy of character recognition by OCR is improved. In addition, since the background image is generated by correcting the content area pixels by using the peripheral pixels, it is possible to generate a smooth background image.

In addition, in the first embodiment, in a case where the area EA being in contact with the image edge of the input image IM exists in the first content area CA1, the division unit 11, the generation unit 12, and the removal unit 13 further perform the following processes. Namely, the division unit 11 further divides the edge image existing in the edge area EA into the second content area CA2 and the second background area BA2. The generation unit 12 further corrects the second content area pixels included in the second content area CA2 by using second peripheral pixels existing in the vicinity of the second content area CA2 among the second background area pixels included in the second background area BA2. By the correction, the generation unit 12 generates the second background image formed with the after-correction second content area pixels and the second background area pixels. The removal unit 13 further removes the second background image from the input image IM.

By doing so, with respect to the edge area EA corresponding to the shadow area SD, since the background (namely, shadow) except for the content becomes white, it is possible to improve a degree of recognition for the content in the shadow area SD.

[b] Second Embodiment

Figure 23:
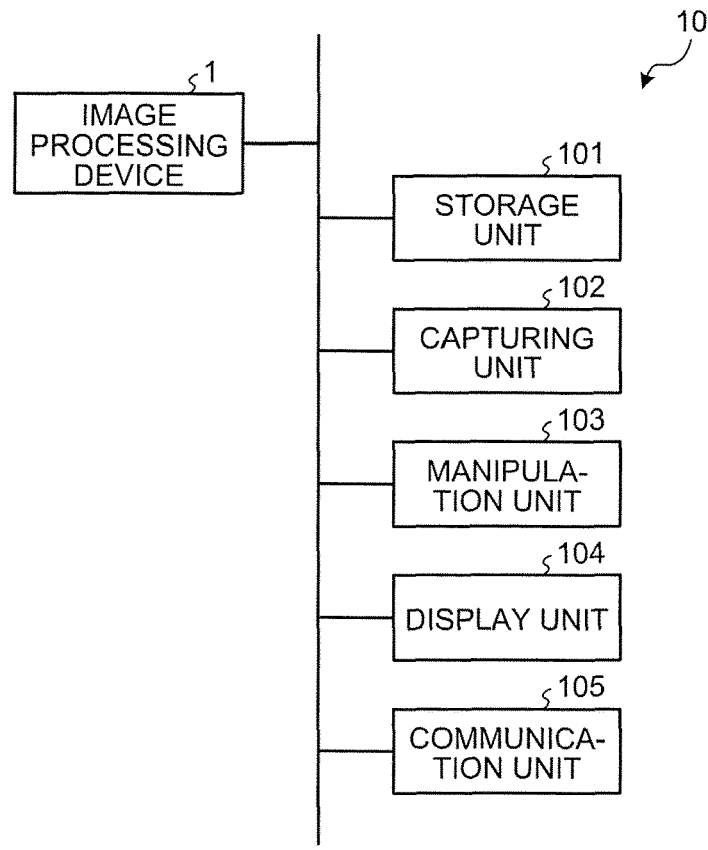
FIG. 23 is a diagram illustrating a configuration example of a mobile terminal according to a second embodiment.

FIG. 23 is a diagram illustrating a configuration example of a mobile terminal according to a second embodiment. In FIG. 23, a mobile terminal 10 is configured to include an image processing device 1, a storage unit 101, a capturing unit 102, a manipulation unit 103, a display unit 104, and a communication unit 105. The storage unit 101 is implemented as hardware, for example, by a memory. As an example of the memory, there may be exemplified random access memory (RAM) such as synchronous dynamic random-access memory (SDRAM), read only memory (ROM), flash memory, or the like. The capturing unit 102 is implemented as hardware, for example, by a camera. The manipulation unit 103 and the display unit 104 are implemented as hardware, for example, by a touch panel. The communication unit 105 is implemented as hardware, for example, by a wireless communication module or a network interface module.

In the mobile terminal 10, for example, an image captured by the capturing unit 102 or an image stored in the storage unit 101 becomes an input image of the image processing device 1. In addition, an output image from the image processing device 1 is stored in the storage unit 101 or displayed on the display unit 104.

[c] Third Embodiment

Figure 24:
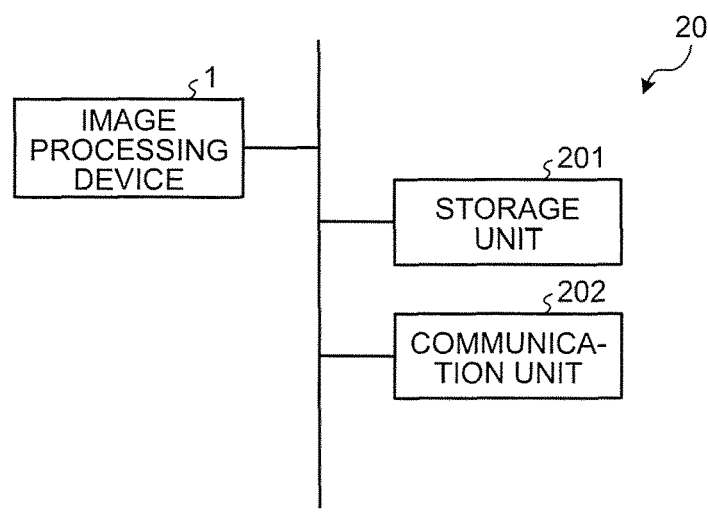
FIG. 24 is a diagram illustrating a configuration example of a computer device according to a third embodiment.

FIG. 24 is a diagram illustrating a configuration example of a computer device according to a third embodiment. A computer device 20 illustrated in FIG. 24 is, for example, a server. In FIG. 24, the computer device 20 is configured to include an image processing device 1, a storage unit 201, and a communication unit 202. The storage unit 201 is implemented as hardware, for example, by a memory, a Hard Disk Drive (HDD), a solid state drive (SSD), or the like. As an example of the memory, there may be exemplified RAM such as SDRAM, ROM, flash memory, or the like. The communication unit 202 is implemented as hardware, for example, by a wireless communication module or a network interface module.

In the computer device 20, for example, an image received from the mobile terminal 10 by the communication unit 202 or an image stored in the storage unit 201 becomes an input image of the image processing device 1. In addition, an output image from the image processing device 1 is stored in the storage unit 201 or transmitted to the mobile terminal 10 by the communication unit 202.

[d] Other Embodiments

[1] All or a portion of each of the above-described processes in the image processing device 1 may be implemented by causing a processor included in the image processing device 1 to execute a program corresponding to each process. For example, the program corresponding to each of the above-described processes may be stored in a memory, and the program may be read from the memory to be executed by the processor. In addition, the program may be stored in a program server connected to the mobile terminal 10 or the computer device 20 via an arbitrary network, and the program may be downloaded from the program server to the mobile terminal 10 or the computer device 20 to be executed. The program may be stored in a recording medium that can be read by the computer device 20, and the program may be read from the recording medium to be executed. The recording medium that can be read by the computer device 20 includes a portable storage medium such as a memory card, a USB memory, an SD card, a flexible disk, a magneto optical disk, a CD-ROM, a DVD, or a Blu-ray (registered trade mark) disk. In addition, the program is a data processing method described in arbitrary language or arbitrary describing method, and any format such as a source code or a binary code may be used. In addition, the program is not necessarily limited to be configured as a single entity, but the program may be configured as a plurality of modules or a plurality of libraries in a distributed manner, or the program may achieve its functions in cooperation with a separate program typified by an OS.

[2] Specific distributed or integrated forms of the image processing device 1 are not limited to the illustrated forms, but all or a portion of the image processing device 1 may be functionally or physically distributed or integrated in arbitrary units according to various additions or according to functional loads to be configured.

As described above, according to an aspect of the embodiments, it is possible to improve a degree of recognition for content in an image.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An image processing device comprising:
   a memory; and
   a processor coupled to the memory, wherein
   the processor is configured to execute:
   dividing an input image into a first content area and a first background area;
   correcting a first content area pixel included in the first content area by using a first peripheral pixel existing in the vicinity of the first content area among first background area pixels included in the first background area to generate a first background image formed with the after-correction first content area pixel and the first background area pixel;
   removing the first background image from the input image to obtain a first removed image;
   restoring an edge of a first content image included in the first removed image; and
   compensating for a gradation value of the after-edge-restoration first content image.

2. The image processing device according to claim 1, wherein
   the dividing includes dividing the input image into the first content area and the first background area on the basis of a peak of a histogram of the input image.

3. The image processing device according to claim 1, wherein
   the correcting includes correcting the first content area pixel by replacing a gradation value of the first content area pixel with a weighted average value of gradation values of the first peripheral pixels according to a first distance between the first content area pixel and the first peripheral pixel.

4. The image processing device according to claim 3, wherein
   the correcting includes calculating a first average value of the gradation values of the first peripheral pixels existing in a predetermined range adjacent to the first content area and performing weighted averaging on the gradation values of the first peripheral pixels by using the first average value.

5. The image processing device according to claim 1, wherein
   the compensating includes compensating for the gradation value of a first content pixel forming the after-edge-restoration first content image by using a gradation value of the first content area pixel after the correction in the correcting to compensate for the gradation value of the after-edge-restoration first content image.

6. The image processing device according to claim 1, wherein,
   the dividing includes dividing an edge image existing in an edge area being in contact with an image edge of the input image in the first content area into a second content area and a second background area,
   the correcting includes correcting a second content area pixel included in the second content area by using a second peripheral pixel existing in the vicinity of the second content area among second background area pixels included in the second background area to generate a second background image formed with the after-correction second content area pixel and the second background area pixels, and
   the removing includes removing the second background image from the input image.

7. The image processing device according to claim 6, wherein
   the dividing includes dividing the edge image into the second content area and the second background area on the basis of a peak of a histogram of only the edge image in the input image.

8. The image processing device according to claim 6, wherein
   the correcting includes correcting the second content area pixel by replacing a gradation value of the second content area pixel with a weighted average value of gradation values of the second peripheral pixels according to a second distance between the second content area pixel and the second peripheral pixel.

9. The image processing device according to claim 8, wherein
   the correcting includes calculating a second average value of the gradation values of the second peripheral pixels existing in a predetermined range adjacent to the second content area and performing weighted averaging on the gradation values of the second peripheral pixels by using the second average value.

10. The image processing device according to claim 8, wherein,
    in a case where each of the first peripheral pixels are included in both of the first background area and the second background area, the correcting includes setting a weighting factor of the gradation value of the first peripheral pixel included in the first background area to be larger than a weighting factor of the gradation value of the first peripheral pixel included in the second background area and correcting the first content area pixel by replacing the gradation value of the first content area pixel with a weighted average value of the gradation values of the first peripheral pixels according to a first distance between the first content area pixel and the first peripheral pixel.

11. The image processing device according to claim 8, wherein,
in a case where each of the second peripheral pixels are included in both of the first background area and the second background area, the correcting includes setting a weighting factor of the gradation value of the second peripheral pixel included in the second background area to be larger than a weighting factor of the gradation value of the second peripheral pixel included in the first background area and correcting the second content area pixel by replacing the gradation value of the second content area pixel with a weighted average value of the gradation values of the second peripheral pixels according to a second distance between the second content area pixel and the second peripheral pixel.

12. The image processing device according to claim 6, wherein
the compensating includes compensating for a gradation value of a second content pixel forming a second content image included in a second removed image obtained in the removing the second background image from the input image by using a gradation value of the second content area pixel after the correction in the correcting.

13. The image processing device according to claim 12, wherein,
in a case where each of the first peripheral pixels are included in both of the first background area and the second background area, the correcting includes setting a weighting factor of the gradation value of the first peripheral pixel included in the first background area to be larger than a weighting factor of the gradation value of the first peripheral pixel included in the second background area and correcting the first content area pixel by replacing the gradation value of the first content area pixel with a weighted average value of the gradation values of the first peripheral pixels according to a first distance between the first content area pixel and the first peripheral pixel.

14. The image processing device according to claim 12, wherein,
in a case where each of the second peripheral pixels are included in both of the first background area and the second background area, the correcting includes setting a weighting factor of the gradation value of the second peripheral pixel included in the second background area to be larger than a weighting factor of the gradation value of the second peripheral pixel included in the first background area and correcting the second content area pixel by replacing the gradation value of the second content area pixel with a weighted average value of the gradation values of the second peripheral pixels according to a second distance between the second content area pixel and the second peripheral pixel.

15. The image processing device according to claim 6, wherein,
in a case where each of the first peripheral pixels are included in both of the first background area and the second background area, the correcting includes correcting the first content area pixel by using only the first peripheral pixel included in the first background area but not by using the first peripheral pixel included in the second background area.

16. The image processing device according to claim 6, wherein, in a case where each of the second peripheral pixel are included in both of the first background area and the second background area, the correcting includes correcting the second content area pixel by using only the second peripheral pixel included in the second background area but not by using the second peripheral pixel included in the first background area.

17. An image processing method comprising:
dividing an input image into a content area and a background area;
correcting a content area pixel included in the content area by using a peripheral pixel existing in the vicinity of the content area among background area pixels included in the background area to generate a background image formed with the after-correction content area pixel and the background area pixel;
removing the background image from the input image to obtain a removed image;
restoring an edge of a content image included in the removed image; and
compensating for a gradation value of the after-edge-restoration content image.

18. A non-transitory computer-readable recording medium having stored therein an image processing program which causes a processor to execute a process comprising:
a processor coupled to the memory, wherein
the processor is configured to execute:
dividing an input image into a content area and a background area;
correcting a content area pixel included in the content area by using a peripheral pixel existing in the vicinity of the content area among background area pixels included in the background area to generate a background image formed with the after-correction content area pixel and the background area pixel;
removing the background image from the input image to obtain a removed image;
restoring an edge of a content image included in the removed image; and
compensating for a gradation value of the after-edge-restoration content image.

* * * * *